3,542,669
ARSENIC REMOVAL
Richard J. DeFeo, Baton Rouge, La., assignor to Esso Research and Engineering Company, a corporation of Delaware
No Drawing. Filed Oct. 4, 1968, Ser. No. 764,997
Int. Cl. C10g 25/00
U.S. Cl. 208—91      11 Claims

ABSTRACT OF THE DISCLOSURE

The removal of arsenic and its derivatives and in particular arsine from admixture may be accomplished by contacting the mixture with a lignite-based activated carbon.

FIELD OF INVENTION

This invention relates to an improvement in the removal of arsenic from feedstreams and, more specifically, from petroleum feedstreams. With more particularity, this invention relates to an improvement in the processing of petroleum feedstreams in those instances wherein the removal of arsenic and its derivatives from the feedstream is necessary prior to processing in order to prevent catalyst deactivation or other undesirable results such as excessive coke formation.

The removal of arsenic from various feetstreams is a significant problem. The arsenic is found in conjunction with inorganic compounds but more frequently it is found in admixture with organic compounds especially petroleum derivatives.

In the petroleum industry arsenic has long been recognized as a problem since arsenic is found in small amounts in many petroleum feedstreams, i.e., 4 or 5 parts per million up to 1 part per thousand. This trace amount is unfortunately sufficient to deactivate a wide range of catalysts which are used in petroleum processing. Typical of the processes where deactivation may occur is hydroforming with a platinum catalyst and hydrotreating with a supported cobalt molybdate catalyst. Nickel containing catalysts may also be deactivated, or have their catalytic nature changed by the presence of arsenic.

Additionally, thermal cracking processes, such as steam cracking, which are a major source of valuable unsaturated compounds, are adversely affected by the presence of arsenic. During this process coke tends to form within the cracking zone, or tubes in the cracking furnace; the coke adheres to the walls of the furnace tubes and tends to build up, thereby restricting the effective cross-sectional area of the tube and leading to large pressure drops. In addition, because of the insulating properties of the coke, furnace temperatures must be increased in order to maintain desired reaction temperatures within the tubes. This reduces tube life substantially and increases the frequency of shut-down periods for replacing damaged tubes. It has been found that the coking rate is substantially increased by the presence of particular metals such as arsenic.

PRIOR ART

A variety of procedures have been devised to remove this undesirable arsenic from the various feedstreams with which it is associated. One method, disclosed in U.S. Pat. 2,779,715, requires the use of a basic compound, such as the alkaline or alkali earth metals and their derivatives as absorbents.

Another method for removing arsenic from petroleum fractions is reported in U.S. Pat. 2,781,297. This procedure involves contacting the arsenic containing petroleum fraction with a salt of copper and/or metals lower than copper in the electromotive series, e.g., mercury, silver, palladium, platinum, gold, etc. Generally, the salts are those of acids, such as sulfates, chlorides, nitrates, fluorides, etc., but may also be organic acid salts such as acetates, propionates, butyrates, valerates, etc. The salt is preferably composited with a porous support, such as kieselguhr, silica gel, alumina, magnesia, silica, clays, and the like.

Perhaps the best known method for removing arsenic from petroleum feedstreams requires the use of particular activated carbon as an absorbent. Activated carbon, because of its porous nature, serves to absorb the arsenic from various feedstreams. In the past, activated carbon with extensive surface area, such as activated coconut carbon has been used for arsenic removal. The activated carbon was also impregnated with acids such as sulfuric acid, or with metals which will tend to increase the arsenic removal process by converting the arsenic to arsenate which may be more easily removed from a feedstream.

Despite the wide use of the high surface area activated carbon (as an absorbent) in the removal or arsenic it has presented several undesirable features. Initially, the activated carbon has had limited attraction for arsenic and arsenic derivatives such as arsine. Thus, substantial amounts of arsine have passed on into processing sequences wherein they were capable of deactivating catalyst or encouraging the formation of coke. Additionally, polar compounds which are traditionally found in conjunction with the arsenic in petroleum feedstreams, such as $H_2S$ and methanol tend to sharply reduce capacity of the activated carbon. As a result, a continuous process was difficult to utilize since the capacity loss of the carbon was sharp: a process had to be discontinued in order to remove the $H_2S$ and reactivate the carbon.

SUMMARY OF THE INVENTION

According to this invention, it has unexpectedly been discovered that a low surface area lignite-based activated carbon will serve to remove arsenic and its derivatives such as arsine, far more effectively than the high surface area activated carbons. Since arsenic is present as various derivatives such as arsine, arsenious oxide, etc., all derivatives including the pure compound shall be referred to as arsenic. Furthermore, it has been found that lignite-based activated carbon is substantially unaffected by the presence of polar compounds such as $H_2S$ and methanol in the feedstream. The other activated carbons are severely deactivated by these polar compounds.

Best results in removal of arsenic is achieved with a lignite-based activated carbon, at elevated temperatures and pressures.

Generally, temperatures of 100 to 500° F. are satisfactory. Pressure may vary from 0.1 to 500 p.s.i.a., preferably atmospheric to 300 p.s.i.a., the most preferred range is 50–250 p.s.i.a. Pressure and temperature will have to be adjusted depending on whether the feedstream is vapor or liquid.

The lignite-based activated carbon to be used as the means for removing the arsenic in the instant process is derived from the burning of peat moss or other related compounds such as subbituminous coal. Lignite is a type of coal which may exist in various forms all of which may be used successfully in the instant invention. Brown coal is a form of lignite closely related to peat. Lignite contains 20–45% moisture as mined.

Lignite is discussed at length in Kirk-Othmer Encyclopedia of Chemical Technology (2nd edition 1967) John Wiley and Sons Inc., vol. 12, pages 381–412. Within this discussion is included representative data on lignite types; the entire discussion, is herein incorporated by reference.

Lignite-based carbon may be activated by one of the following techniques:

(1) Processes depending upon the action of inorganic compounds either naturally present or added to the raw material to degrade or dehydrate the organic molecule during calcination or carbonization.

(2) Processes depending upon selective oxidation of the carbonaceous matter with air at low temperature, or steam, $CO_2$ or flue gas at high temperature. The oxidation is usually preceded by a primary carbonization of the raw material.

The preferred form of the lignite-based activated carbon contains high metal ash content. Thus, the best coconut based carbon contains only 1.9% ash, while the most desirable lignite carbon contains 11.2% ash, consisting of salts of Ca, Al, Ti, Cu, Fe and Si. It is most preferred to utilize a lignite carbon with more than 3% by weight of non-combustible ash.

Contact time is an important variable and best results have been found with contact times of 0.01 to 1 minute, preferably 0.05 to 0.5 minute for vapor phase contacting Liquid phase applications are correspondingly longer, i.e. 0.01 to 10 min.

Unexpectedly, it has been found that high temperatures favor the effective absorption of arsenic. This is surprising because if the attraction was physical in nature high temperature would tend to discourage absorption. Physical adsorption of hydrocarbons or other materials on solid absorbents generally increases as temperature is decreased, and in fact, most absorbents are desorbed by elevating the temperature. While not wishing to be bound by any particular theory, a possibility does exist that a chemical attraction, rather than a physical one, is formed between the lignite-based activated carbon and the arsenic. The arsenic once reacted with or adsorbed on the lignite-based carbon is very difficult to remove, further indicating a chemical reaction has taken place. Steaming of the bed up to 500° F. only removes a small portion of the arsenic.

The lignite-based activated carbon is used in the form of particles; these particles may range in size from a powder to ½ inch, preferably 1/16 inch to ¼ inch.

The feedstream may be introduced in either the liquid or vapor state; it is, however, preferred to use the vapor state. Flow rates of 0.1 to 100 w./hr./w. may be utilized, preferably 1 to 10 w./hr./w.

If desired, the lignite-based activated carbon may be impregnated with one of the following: Oxidizing agents, such as permanganate and chromate salts; acidic components such as $H_2SO_4$ and $H_3PO_4$; bases such as NaOH, Soda lime are also applicable.

In a typical petroleum feedstream polar compounds, such as hydrogen sulfide and methanol may be found in quantities of a few p.p.m. to several percent by weight, i.e. 7 or 8 wt. percent. This can serve to reduce the capacity of activated coconut carbon or other currently favored activated carbon absorbents to about one-third. The lignite-based activated carbon of the instant invention will not be so deactivated.

In an embodiment of the instant invention removal of arsenic from a petroleum feedstream was effected by contacting it with lignite-based activated carbon prior to its passage into a steam cracking zone. The feedstream consisted of ethane and propane obtained from catalytic cracking of refinery feedstocks. The arsenic content varied from 0.3 to 1 p.p.m. The $H_2S$ content varied from 5 to 50 p.p.m. The feed contained 75 to 100% ethane, depending on refinery operating conditions.

The feedstream, at a temperature of 70 to 150° F. was passed over a bed which contained particles of lignite-based activated carbon. The lignite-based activated carbon was present in the form of particles ranging in size from 4 to 12 mesh. Pressure over the bed was maintained at 80 to 120 p.s.i.g. The feed rate of the petroleum stream was about 25,000 lbs./hr. so that its contact time with the bed was 0.75–1 min. Originally, the stream contained 400–500 p.p.b. of arsenic and arsenic derivatives. Immediately after the contacting with the lignite-based activated carbon the stream contained 0% of arsenic. After the removal of the arsenic and arsenic derivatives that feedstream was subjected to a steam cracking operation.

The cracking operation is well known and will be only briefly discussed here. See, for example, Chemical Week, Nov. 13, 1965, page 72 et seq. Generally, the petroleum feed fraction is admixed with steam, i.e., in amounts ranging from about 20 to 80 mol percent steam, preferably about 20 to 60 mol percent, prior to entry into the steam cracking furnace. The furnace normally contains two sections, a convection section wherein the feed is vaporized if not already in that form, and a radiant or cracking section, the feed being passed in admixture with steam through one or more tubes located within the furnace. The convection section is normally employed to increase heating efficiency and the petroleum-steam mixture is heated therein to temperatures of about 1000° to 1100° F. However, these temperatures are below that at which the feed cracks since cracking is undesirable in the convection section the heated feed then passes into the radiant section where the temperature is quickly raised to about 1200° to 1700° F. or higher as tube metal materials permit, and the feed is cracked. Residence times in the radiant section are carefully controlled to minimize coke formation, polymerization, and other undesirable reactions. Thus, residence times in the cracking section will range from 0.1 to 10 seconds, preferably about 0.1 to 1 second. Pressures within the tubes may range from about 0–50 p.s.i.g. but are not critical, and higher pressures, e.g., up to about 100 p.s.i.g., can be tolerated. Upon exiting the cracking section, the reaction products are immediately quenched to stop further reactions and/or minimize loss of primary conversion products.

The petroleum fractions which may be converted by this process may vary widely in boiling point range. Generally, however, the process is most applicable to hydrocarbon feeds consisting essentially of cyclic or acyclic saturated hydrocarbons. Thus, hydrocabon feeds that may be utilized herein include such cyclic hydrocarbons as cyclopropane, cyclopentane, cyclooctane, etc., and mixtures thereof. The acyclic hydrocarbon feeds include any alkane, namely, aliphatic hydrocarbons of the methane series or mixtures of alkanes with cycloalkanes. The preferred feeds for use are saturated hydrocarbons containing from 2 to 24 carbon atoms and, more preferably, alkanes containing from 2 to about 12 carbon atoms. Exemplary hydrocarbon feeds which can be used in the practice of this invention are butane, ethane, propane, isobutane, n-hexane, n-decane, n-dodecane, n-hexadecane, eicosane, tricosane and light naphthas boiling at standard pressures, within a range of from about 90° to 430° F. In addition to the foregoing, gas oils having boiling points ranging generally from about 450° to about 800° F. and kerosenes having a boiling temperature ranging from about 430° to about 550° F. can also be utilized in the practice of this invention.

DETAILED DESCRIPTION

Example 1

Previously activated coconut carbon had been recognized as the most effective absorbent for arsenic since it has the largest surface area and consequently, in the past had demonstrated the greatest absorptive ability. In Example 1 a series of tests were run comparing several carbons including coconut carbon and lignite-based activated carbon. The carbons were commercially available materials.

The test conditions for all the various activated carbons were identical. A feedstream comprising 200 p.p.m. of arsine in argon was contacted with each carbon. Temperature was maintained at 75° F. in the bed; pressure was maintained at 120 p.s.i.g. The feed rate was 1 cu. ft./hour and the superficial velocity was 1 ft./minute. In each instance 5 grams of carbon was utilized and maintained in a ½" tube whose L to D ratio was 5. The amount of arsine adsorbed on the bed was determined by the following test. A solution of silver diethyldithiocarbamate in pyridine was used to monitor the gas stream emerging from the absorption bed. When the first arsine breakthrough occurred, the solution changed from yellow to red, indicating the capacity of the bed had been reached. The results are indicated in Table 1.

TABLE 1

| Carbon type | Surface area, m.²/g. | Capacity, wt. percent $AsH_3$ |
|---|---|---|
| Bone | | 0.01 |
| Wood | | 0.2 |
| Coal (6 types) | 900–1,100 | 0.6–0.8 |
| Coconut and other nuts (10 types) | 1,100–1,400 | 0.8 |
| Pulp mill | | 0.7 |
| Lignite | 650–700 | 1.5 |

From the above table it is apparent that the lignite, which has approximately ½ the surface area of the coconut carbon has a far greater capacity for arsine. The greater capacities of the lignite are totally unexpected since it would be anticipated that the adsorptive ability would vary directly with the surface area. This would tend to support the theory that there is a chemical attraction rather than a mere physical attraction but it should be emphasized there is no intention to be bound by any theory.

Example 2

This example is used to illustrate that lignite unexpectedly retains its activity even after saturation of the adsorption bed with a polar compound such as $H_2S$ or methanol. This property is unique to the lignite and when compared with activated coconut carbon and activated coal carbon differences are readily discernible. In this experiment the exact conditions of Example 1 were utilized including testing methods. Table 2 illustrates the results.

TABLE 2

| Type | Coal | Coconut | Lignite |
|---|---|---|---|
| Capacity, $AsH_3$, wt. percent: | | | |
| Without impurities as determined in Ex. 1 | 0.8 | 1.0 | 1.5 |
| After $H_2S$ bed saturation | 0.3 | | 1.1 |
| After methanol saturation | | 0.3 | 1.2 |
| After $H_2S$ and methanol saturation | | | 1.4 |

From the above, it is apparent that the lignite retains a substantial portion of its absorptive capacity even when exposed to a polar material which compete for adsorptive capacity. By contrast, both the coconut carbon and the coal carbon show substantial loss in absorptive capacity. In fact, the coconut carbon was reduced to a level of only 0.3 after methanol saturation; the coal carbon was reduced to a level of 0.3 by $H_2S$ bed saturation.

Although this invention has been described with some degree of particularity it is intended only to be limited by the attached claims.

What is claimed is:

1. An improved process for removing arsenic from a feedstream in which said arsenic is in admixture which comprises contacting said feedstream, under absorption conditions, with a lignite-based activated carbon and recovering a feedstream depleted in arsenic.

2. The process of claim 1 wherein said feedstream is a petroleum fraction.

3. The process of claim 2 wherein said contacting takes place at a temperature of 100 to 500° F.

4. The process of claim 2 wherein said contacting takes place in the vapor phase.

5. An improved process for removing arsenic from a petroleum feedstream which comprises arsenic and at least 5 ppm. of a polar compound which comprises contacting said feedstream, under absorption conditions, with a lignite-based activated carbon and recovering a feedstream depleted in arsenic.

6. The process of claim 5 wherein said contacting takes place in the vapor phase.

7. The process of claim 6 wherein said arsenic is in the form of arsine.

8. The process of claim 6 wherein said polar compound is selected from the group consisting of hydrogen sulfide and methanol.

9. The process of claim 6 wherein said lignite-based activated carbon has at least 3% metallic ash content.

10. The process of claim 6 wherein said feedstream comprises ethane and propane obtained from the catalytic cracking of petroleum feedstreams and said arsenic depleted feedstream is passed into a stream cracking zone.

11. The process of claim 6 wherein said arsenic depleted feedstream is passed into a catalytic conversion zone.

References Cited

UNITED STATES PATENTS

| 2,508,474 | 5/1950 | Slyh et al. | 252—422 |
| 2,884,369 | 4/1959 | Mattox et al. | 208—91 |
| 3,093,574 | 6/1963 | Bertolacini | 208—91 |

DELBERT E. GANTZ, Primary Examiner

R. M. BRUSKIN, Assistant Examiner

U.S. Cl. X.R.

208—307; 252—421; 260—683